(12) United States Patent
Lee

(10) Patent No.: US 11,017,286 B2
(45) Date of Patent: May 25, 2021

(54) NEUROMORPHIC DEVICE INCLUDING A SYNAPSE HAVING A VARIABLE RESISTOR AND A TRANSISTOR CONNECTED IN PARALLEL WITH EACH OTHER

(71) Applicant: SK hynix Inc., Icheon (KR)

(72) Inventor: Hyung-Dong Lee, Hwaseong (KR)

(73) Assignee: SK hynix Inc., Icheon (KR)

( * ) Notice: Subject to any disclaimer, the term of this patent is extended or adjusted under 35 U.S.C. 154(b) by 974 days.

(21) Appl. No.: 15/658,933

(22) Filed: Jul. 25, 2017

(65) Prior Publication Data
US 2018/0240009 A1 Aug. 23, 2018

(30) Foreign Application Priority Data
Feb. 20, 2017 (KR) .................. 10-2017-0022015

(51) Int. Cl.
*G06N 3/04* (2006.01)
*G06N 3/063* (2006.01)
*G06N 3/08* (2006.01)

(52) U.S. Cl.
CPC .............. *G06N 3/04* (2013.01); *G06N 3/049* (2013.01); *G06N 3/063* (2013.01); *G06N 3/08* (2013.01)

(58) Field of Classification Search
CPC .......... G06N 3/04; G06N 3/049; G06N 3/063; G06N 3/08
See application file for complete search history.

(56) References Cited

U.S. PATENT DOCUMENTS

| 7,463,506 | B2* | 12/2008 | Muraoka ............. G11C 11/5685 365/100 |
| 9,269,042 | B2 | 2/2016 | Friedman et al. |
| 2011/0119214 | A1* | 5/2011 | Breitwisch ........... G06N 3/0635 706/33 |

OTHER PUBLICATIONS

Kim, Yongtae, Yong Zhang, and Peng Li. "A reconfigurable digital neuromorphic processor with memristive synaptic crossbar for cognitive computing." ACM Journal on Emerging Technologies in Computing Systems (JETC) 11.4 (2015): 1-25. (Year: 2015).*

* cited by examiner

*Primary Examiner* — Eric Nilsson

(57) ABSTRACT

A neuromorphic device may include a pre-synaptic neuron, a row line extending in a row direction from the pre-synaptic neuron, a post-synaptic neuron, a column line extending in a column direction from the post-synaptic neuron, and a synapse disposed at an intersection region between the row line and the column line. The synapse may include a first node electrically connected with the row line, a second node electrically connected with the column line, and a variable resistor and a first transistor electrically coupled between the first node and the second node. The variable resistor and the first transistor may be electrically connected with each other in parallel.

20 Claims, 19 Drawing Sheets

NEUROMORPHIC DEVICE INCLUDING A SYNAPSE HAVING A VARIABLE RESISTOR AND A TRANSISTOR CONNECTED IN PARALLEL WITH EACH OTHER

CROSS-REFERENCE TO RELATED APPLICATIONS

The present application claims priority to Korean Patent Application No. 10-2017-0022015, filed on Feb. 20, 2017, which is incorporated herein by reference in its entirety.

BACKGROUND

1. Field

The present disclosure relates to neuromorphic devices, and more particularly, to neuromorphic devices including variable resistors and transistors connected in parallel with each other.

2. Description of the Related Art

Recently, much attention has been paid to devices in the field of neuromorphic technology, which use chips that mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitude, and/or times, according to a learning state of the neuromorphic device. The synapses may include a variable resistor being able to be changed depending on the applied numbers of pulses. However, conventional variable resistors have non-linear resistance variations and abrupt resistance variations as pulses are applied. Accordingly, it is difficult to store or output accurate data.

SUMMARY

Embodiments of the present disclosure provide synapses having gradual and linear resistance variations.

Embodiments of the present disclosure provide neuromorphic devices including the synapses having gradual and linear resistance variations.

Other embodiments of the present disclosure are not limited to the aforementioned embodiments, and may be understood by those skilled in the art of the present disclosure in the following descriptions.

In an embodiment of the present disclosure, a neuromorphic device may include a pre-synaptic neuron; a row line extending in a row direction from the pre-synaptic neuron; a post-synaptic neuron; a column line extending in a column direction from the post-synaptic neuron; and a synapse disposed at an intersection region between the row line and the column line. The synapse may include a first node electrically connected with the row line; a second node electrically connected with the column line; and a variable resistor and a first transistor electrically coupled between the first node and the second node. The variable resistor and the first transistor may be electrically connected with each other in parallel.

A gate electrode and a drain electrode of the first transistor may be electrically connected with the first node.

A source electrode of the first transistor may be electrically connected with the second node.

The synapse may further include a second transistor coupled between the first node and the second node. The second transistor, the variable resistor, and the first transistor may be electrically connected with each other in parallel.

A gate electrode and a source electrode of the second transistor may be electrically connected with the second node.

A drain electrode of the second transistor may be electrically connected with the first node.

The synapse may further include a pre-resistor coupled between the pre-synaptic neuron and the first node.

The pre-resistor may be coupled between the row line and the first node.

The neuromorphic device may further include a pre-resistor that may be coupled between the pre-synaptic neuron and the row line.

The synapse may further include a post-resistor coupled between the second node and the post-synaptic neuron.

The post-resistor may be coupled between the second node and the column line.

The neuromorphic device may further include a post-resistor that may be coupled between the column line and the post-synaptic neuron.

In an embodiment of the present disclosure, a neuromorphic device may include a pre-synaptic neuron; a row line extending in a row direction from the pre-synaptic neuron, the row line being coupled to a first node; a post-synaptic neuron; a column line extending in a column direction from the post-synaptic neuron, the column line being coupled to a second node; and a synapse disposed at an intersection region between the row line and the column line. The synapse may include a variable resistor and a first transistor string coupled between the first node and the second node, the variable resistor and the first transistor string being electrically connected with each other in parallel.

The first transistor string may include a plurality of first transistors electrically connected with each other in series. Each gate electrode of the plurality of first transistors may be electrically connected with the first node.

The synapse may further include a second transistor string disposed between the first node and the second node. The second transistor string, the variable resistor, and the first transistor string may be connected with each other in parallel.

The second transistor string may include a plurality of second transistors electrically connected with each other in series. Each gate electrode of the plurality of second transistors may be electrically connected with the second node.

The synapse may further include a third transistor string and a fourth transistor string. Each of which may be disposed between the first node and the second node. The fourth transistor string, the second transistor string, the variable resistor, the first transistor string, and the third transistor string may be connected with each other in parallel.

The third transistor string may include a plurality of third transistors electrically connected with each other in series. Each gate electrode of the plurality of third transistors may be electrically connected with the first node.

The fourth transistor string may include a plurality of fourth transistors electrically connected with each other in series. Each gate electrode of the plurality of fourth transistors may be electrically connected with the second node.

DETAILED DESCRIPTION

Figure 1:
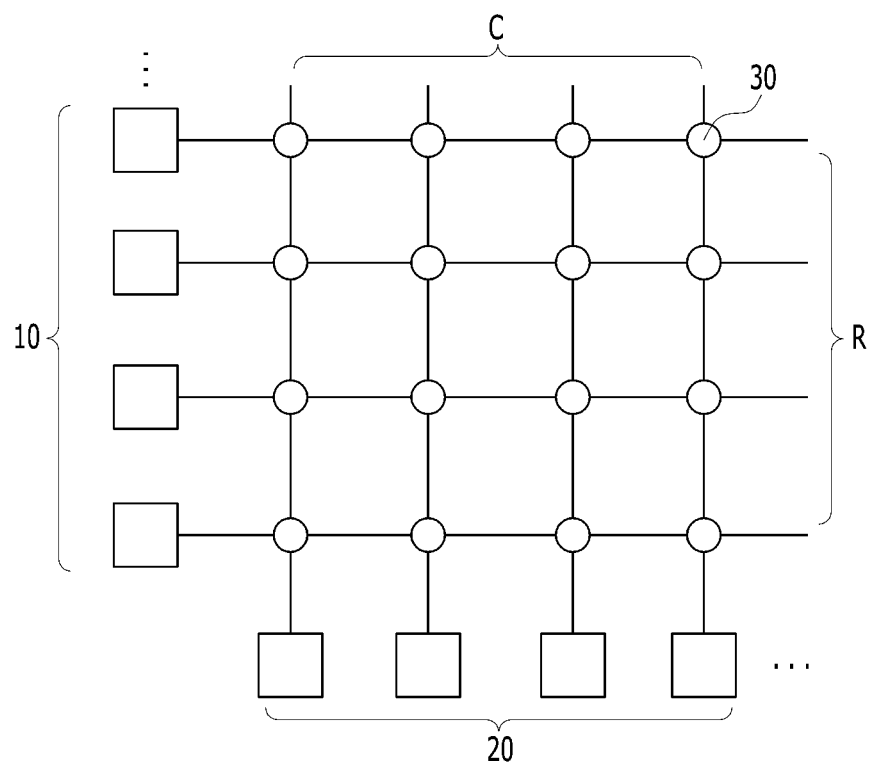
FIG. 1 is a diagram schematically illustrating a neuromorphic device in accordance with an embodiment of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Terms used in this specification are used to describe embodiments without limiting the present disclosure. The terms of a singular form may include plural forms unless referred to the contrary. The meaning of 'comprise' or 'comprising' used in the specification specifies a component, step, operation, and/or element, but does not exclude other components, steps, operations, and/or elements.

When one element is referred to as being 'connected with' or 'coupled with' another element, the former element may be directly connected or coupled with the latter element, or another element may be interposed therebetween. On the other hand, when one element is referred to as being 'directly connected with' or 'directly coupled with' another element, it may indicate that no element is interposed therebetween. In the present disclosure, 'and/or' may include each described item, or one or more combinations of the described items.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

In this specification, 'potentiating,' 'setting', 'learning,' and 'training' may be used as the same or similar terms, and 'depressing,' 'resetting,' and 'initiating' may be used as the same or similar terms. For example, an operation of lowering the resistances of synapses may be described as potentiating, setting, learning, or training, and an operation of raising the resistances of synapses may be described as depressing, resetting, or initiating. Furthermore, when synapses are potentiated, set, or trained, a gradually increasing voltage/current may be outputted because the conductivities of the synapses are increased. On the other hand, when synapses are depressed, reset, or initiated, a gradually decreasing voltage/current may be outputted because the conductivities of the synapses are decreased. For convenience of description, the terms 'data pattern,' 'electrical signal,' 'pulse,' 'spike,' and 'fire' may have the same, a similar, or a compatible meaning. Furthermore, the terms 'voltage' and 'current' may also be interpreted as having the same or a compatible meaning.

FIG. 1 is a diagram schematically illustrating a neuromorphic device in accordance with an embodiment of the present disclosure.

Referring to FIG. 1, the neuromorphic device in accordance with the embodiment of the present disclosure may include a plurality of pre-synaptic neurons 10, a plurality of post-synaptic neurons 20, and a plurality of synapses 30. The plurality of synapses 30 may be disposed at respective intersection regions between a plurality of row lines R, which extend in a row direction from the plurality of pre-synaptic neurons 10, and a plurality of column lines C, which extend in a column direction from the plurality of post-synaptic neurons 20. The row direction may cross the column direction. Each of the intersection regions may be a space between one of the row lines R and one of the column lines C where the row line R and the column line C intersect in a direction perpendicular to the row direction and the column direction. For convenience, four pre-synaptic neurons 10 and four post-synaptic neurons 20 are shown in FIG. 1.

The pre-synaptic neurons 10 may provide or transmit electrical pulses to the synapses 30 through the row lines R in any of a learning mode, a reset mode, and a read mode.

The post-synaptic neurons 20 may provide or transmit electrical pulses to the synapses 30 through the column line C in the learning mode or the reset mode, and may receive electrical pulses from the synapses 30 through the column lines C in the read mode.

The synapses 30 may have multiple resistance levels. For example, a resistance of each of the synapses 30 may be gradually changed into a relatively lower resistance state as first pulses are applied, or may be gradually changed into a relatively higher resistance state as second pulses are applied. The synapses 30 will be more specifically described in detail below.

Figure 2A:
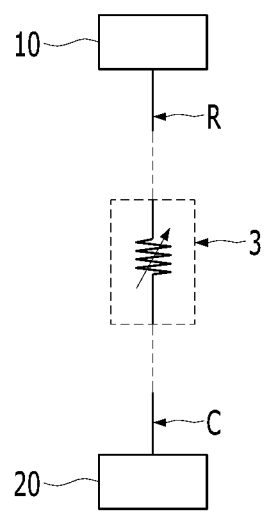
FIGS. 2A and 2B are diagrams illustrating conventional synapses of neuromorphic devices.
Figure 2B:
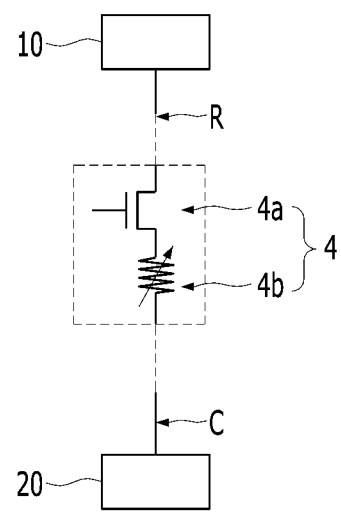
Figure 2C:
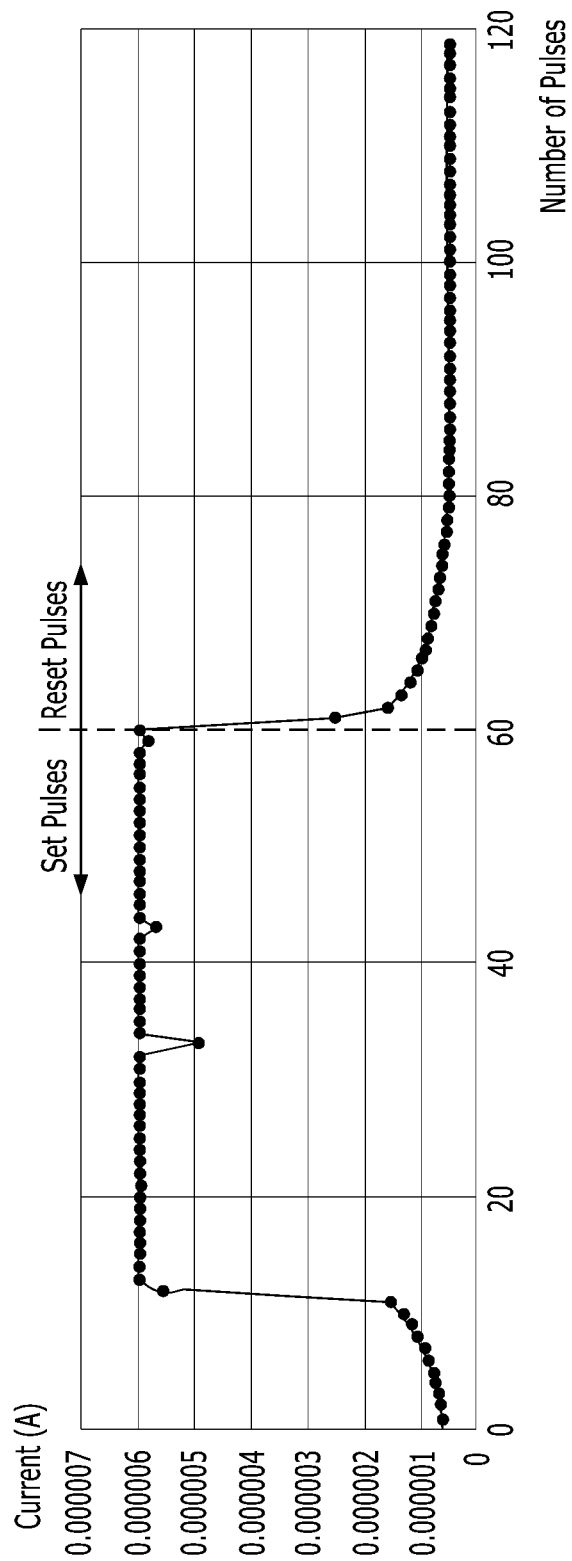
FIG. 2C is a graph illustrating synapse current variations of the conventional synapse of FIG. 2A as set pulses and reset pulses are applied to the conventional synapse.

FIGS. 2A and 2B are diagrams illustrating conventional synapses 3 and 4 of neuromorphic devices, respectively. FIG. 2C is a graph illustrating synapse current variations of the conventional synapse 3 as set pulses and reset pulses are applied to the conventional synapse 3. In FIG. 2C, the X-axis indicates a number of applied pulses and the Y-axis indicates a synapse current of the conventional synapse 3. The synapse current may be a current through the conventional synapse 3.

Referring to FIGS. 2A and 2B, each of the synapses 3 and 4 of the conventional neuromorphic devices includes just one variable resistor, or a variable resistor 4a and a transistor 4b connected in series with each other.

Referring to FIG. 2C, a resistance of the conventional synapse 3 varies abruptly when a specific number of pulses are applied, such that a current through the conventional synapse 3 varies abruptly when the specific number of pulses are applied to the conventional synapse 3. The pulses can be set pulses or reset pulses. In the embodiment illustrated in FIG. 2C, the first sixty pulses applied to the conventional synapse 3 are set pulses, and the next sixty pulses applied to the conventional synapse 3 are reset pulses.

As shown in FIG. 2C, the conventional synapse 3 exhibits heavily asymmetrical resistance variation and current variation as the set pulses and the reset pulses are applied to the conventional synapse 3. That is, the graph of FIG. 2C is asymmetric.

FIG. 2C also shows that the conventional synapse 3 exhibits few different resistance levels. That is, the conventional synapse 3 exhibits little resistance variation as the set pulses and the reset pulses are applied to the conventional synapse 3 when the conventional synapse 3 is in a low resistance state. The few resistance levels of the conventional synapse 3 may be insufficient for certain applications.

Figure 3A:
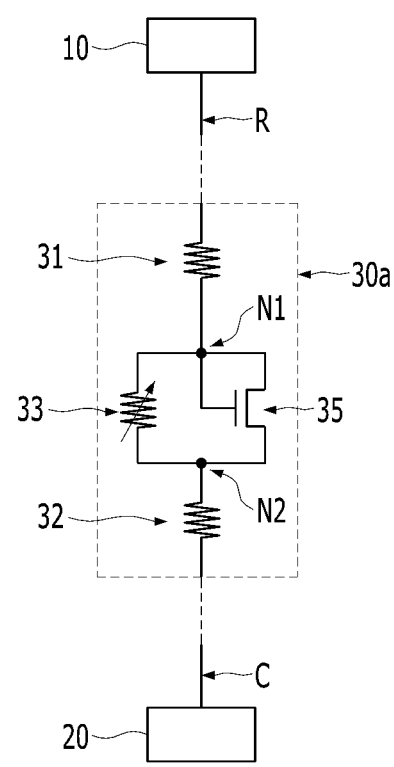
FIG. 3A is a diagram illustrating a synapse of a neuromorphic device in accordance with an embodiment of the present disclosure.
Figure 3B:
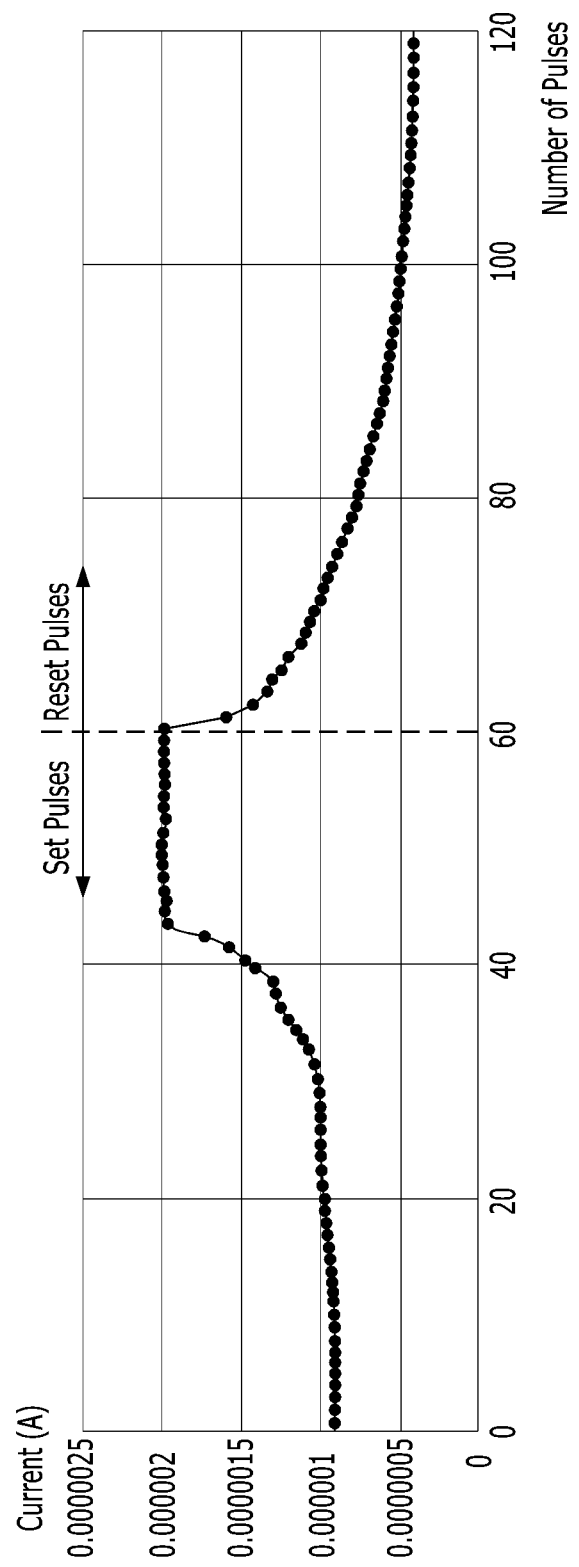
FIG. 3B is a graph illustrating a current variation of the synapse of FIG. 3A as set pulses and reset pulses are applied to the synapse in accordance with an embodiment of the present disclosure.

FIG. 3A is a diagram illustrating a synapse 30a of a neuromorphic device in accordance with an embodiment of the present disclosure. FIG. 3B is a graph illustrating a current variation of the synapse 30a of FIG. 3A as set and reset pulses are applied to the synapse 30a in accordance with an embodiment of the present disclosure.

Referring to FIG. 3A, the synapse 30a of the neuromorphic device may include a pre-resistor 31, a first node N1, a variable resistor 33, a transistor 35, a second node N2, and a post-resistor 32. The pre-resistor 31 may be coupled between a pre-synaptic neuron 10 and the first node N1, and the post-resistor 32 may be coupled between the second node N2 and a post-synaptic neuron 20. Each of the variable resistor 33 and the transistor 35 may be coupled between the first node N1 and the second node N2, such that the variable resistor 33 and the transistor 35 are electrically connected with each other in parallel. A gate electrode and a drain electrode of the transistor 35 may be electrically connected with the first node N1. That is, the gate electrode and the drain electrode may be electrically connected with each other. A source electrode of the transistor 35 may be electrically connected with the second node N2. In some embodiments, the drain electrode and the source electrode can be compatible.

Figure 4A:
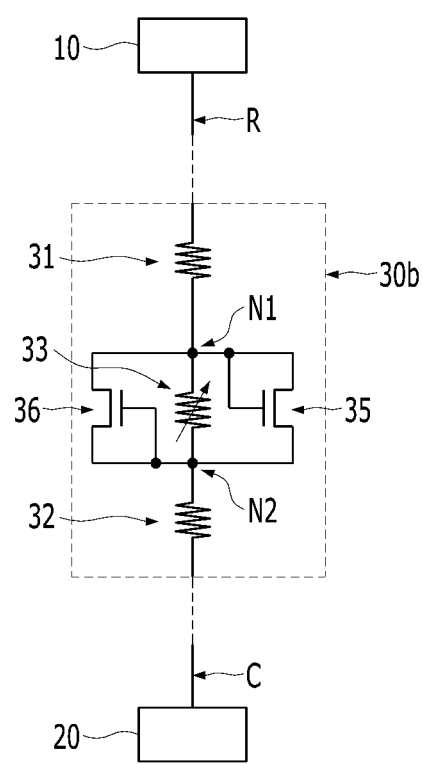
FIG. 4A is a diagram illustrating a synapse of a neuromorphic device in accordance with an embodiment of the present disclosure.
Figure 4B:
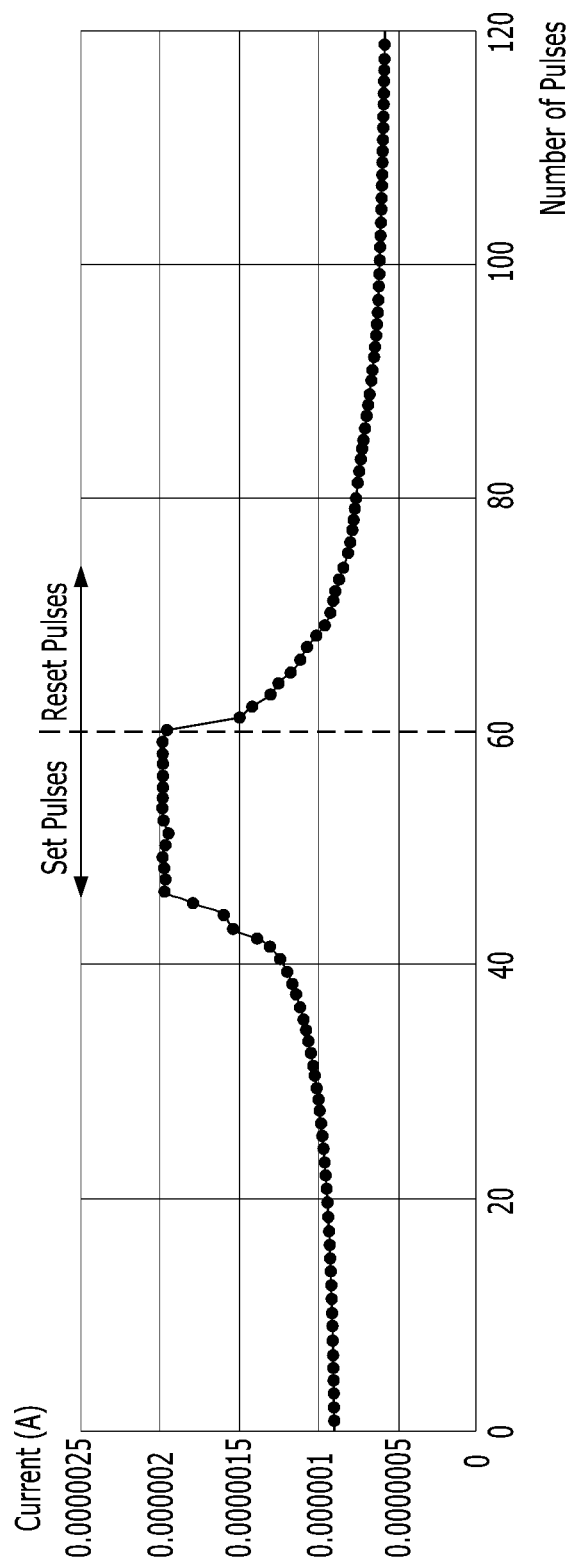
FIG. 4B is a graph illustrating a current variation of the synapse of FIG. 4A as set pulses and reset pulses are applied to the synapse.

FIG. 4A is a diagram illustrating a synapse 30b of a neuromorphic device in accordance with an embodiment of the present disclosure. FIG. 4B is a graph illustrating a current variation of the synapse 30b as set and reset pulses are applied to the synapse 30b.

Referring to FIG. 4A, the synapse 30b may include a pre-resistor 31, a first node N1, a variable resistor 33, a first transistor 35, a second transistor 36, a second node N2, and a post-resistor 32. Each of the variable transistor 33, the first transistor 35, and the second transistor 36 may be coupled between the first node N1 and the second node N2, such that the variable transistor 33, the first transistor 35, and the second transistor 36 are electrically connected with each other in parallel. Specifically, a gate electrode and a drain electrode of the first transistor 35 may be electrically connected with the first node N1, and a gate electrode and a source electrode of the second transistor 36 may be electrically connected with the second node N2. A source electrode of the first transistor 35 may electrically connected with the second node N2, and a drain electrode of the second transistor 36 may be electrically connected with the first node N1. In some embodiments of the present disclosure, the drain electrodes and the source electrodes can be compatible.

Referring to FIGS. 3B and 4B, each of the synapses 30a and 30b exhibit more gradual current variations with respect to the applied numbers of the set and reset pulses than the conventional synapse 3. Accordingly, the synapses 30a and 30b in accordance with the embodiments of the present disclosure can exhibit a greater number of resistance levels than the conventional synapse 3.

Referring to FIGS. 3A and 4A, when a resistance value of the variable resistor 33 is large, a resistance value of the transistor 35 can be small, and when the resistance value of the variable resistor 33 is small, the resistance value of the transistor 35 can be large. Accordingly, a total resistance value of each of the synapses 30a and 30b changes relatively slower with respect to a number of applied pulses than the conventional synapse 3, which does not have any transistors that are connected in parallel with the variable resistor of the synapse 3.

Figure 5A:
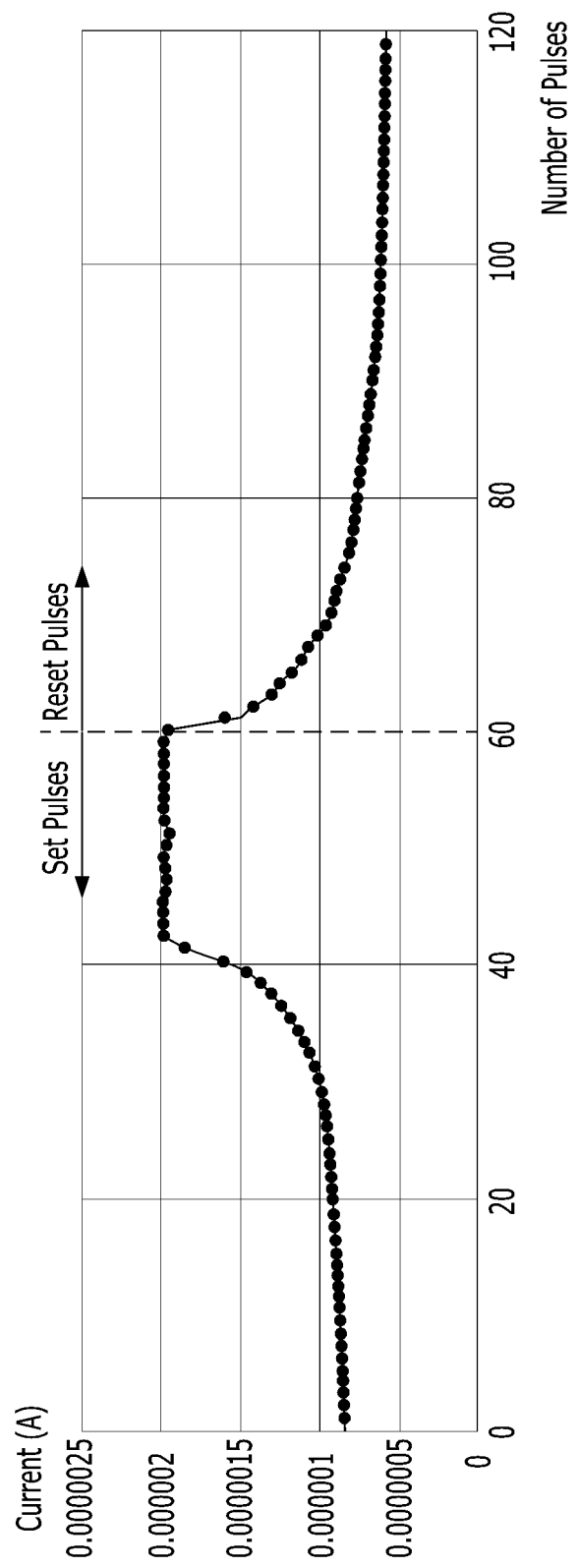
FIGS. 5A to 5C are graphs illustrating current variations of embodiments of the synapse of FIG. 4A having transistors with different channel widths in accordance with embodiments of the present disclosure.
Figure 5B:
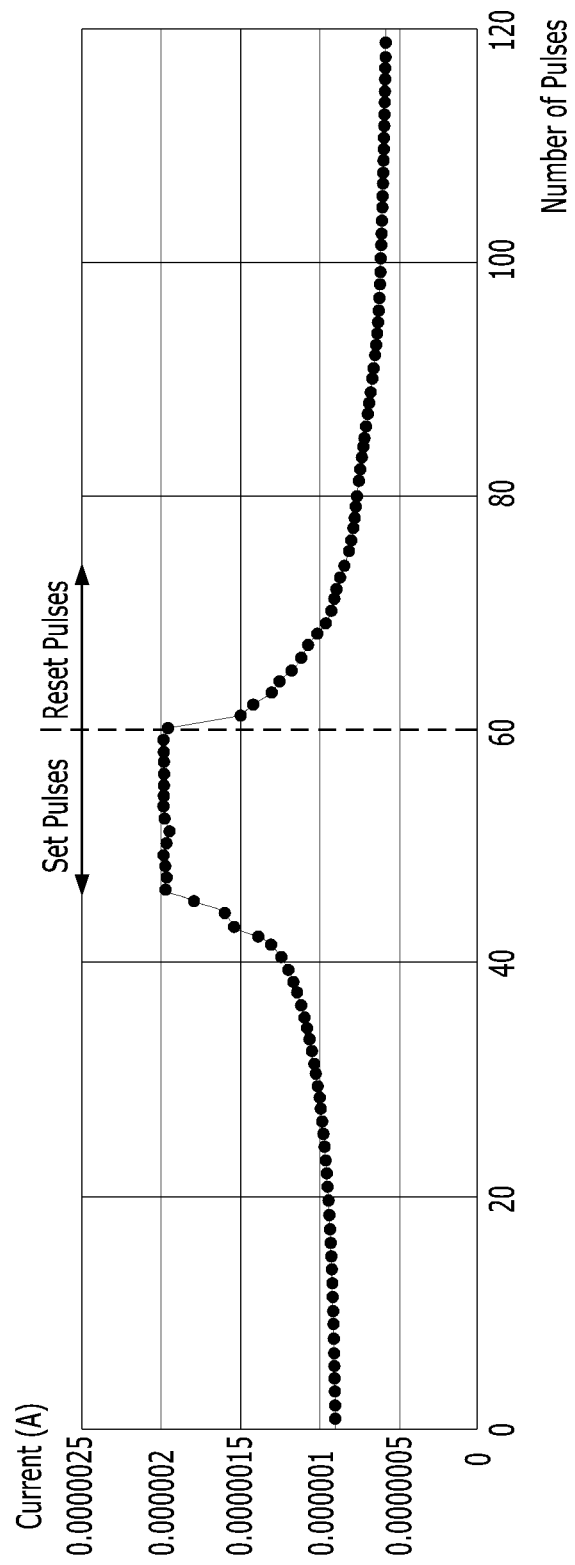
Figure 5C:
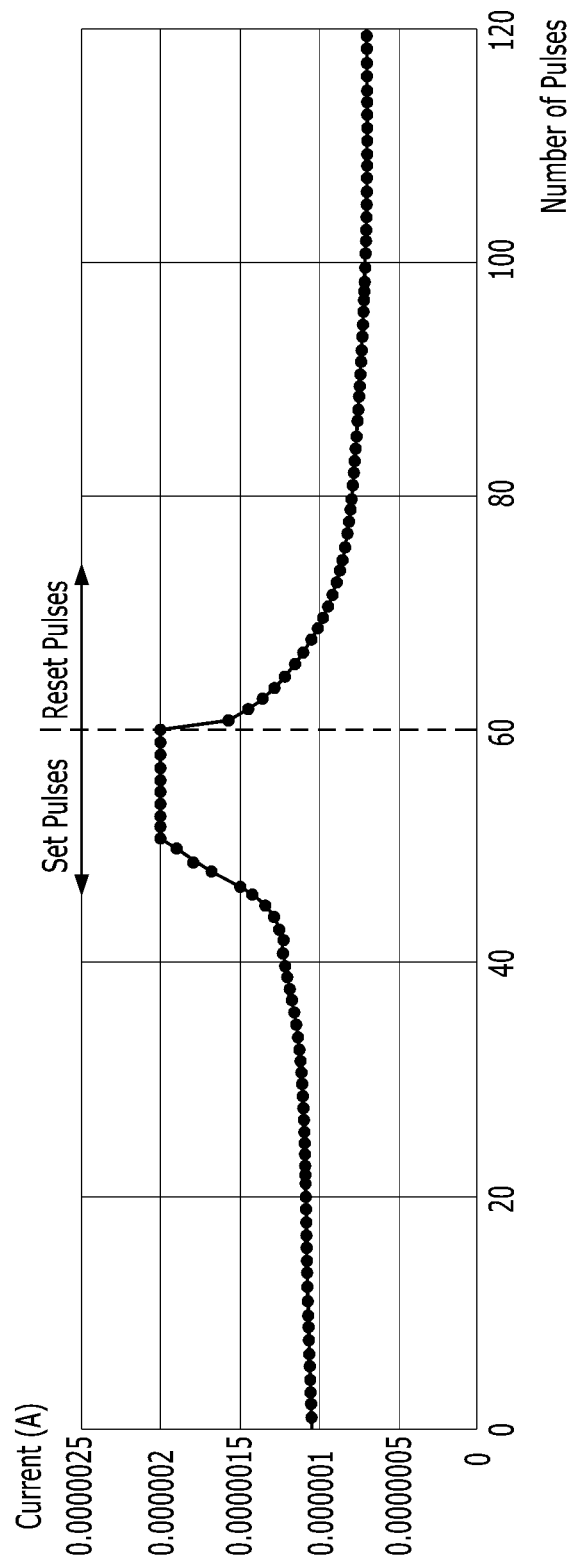
Figure 6A:
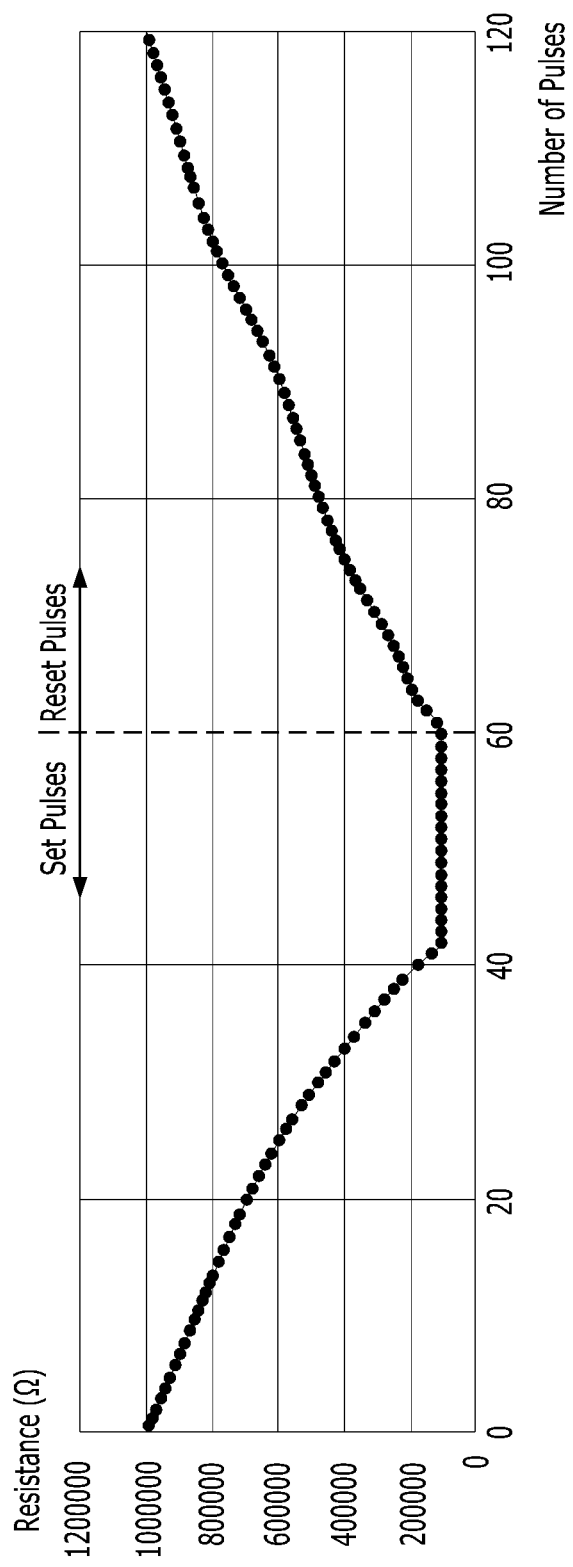
FIGS. 6A to 6C are graphs illustrating resistance variations of embodiments of the synapse of FIG. 4A having transistors with different channel widths in accordance with embodiments of the present disclosure.
Figure 6B:
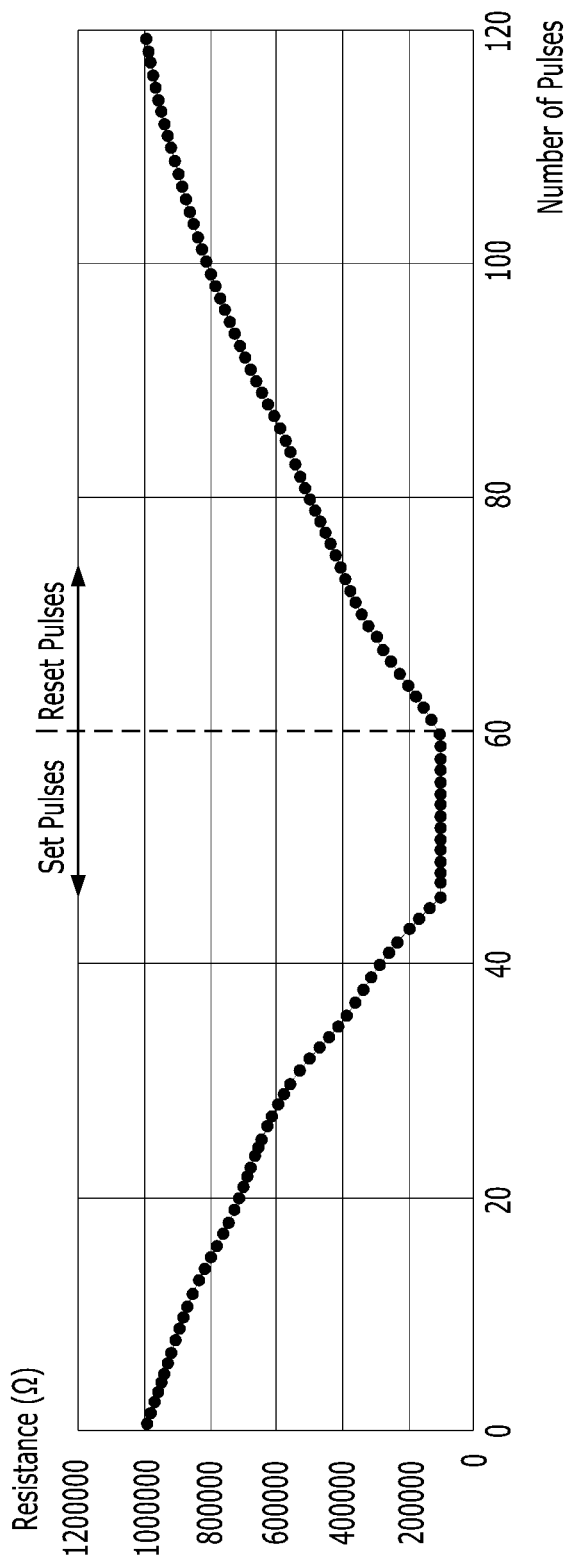
Figure 6C:
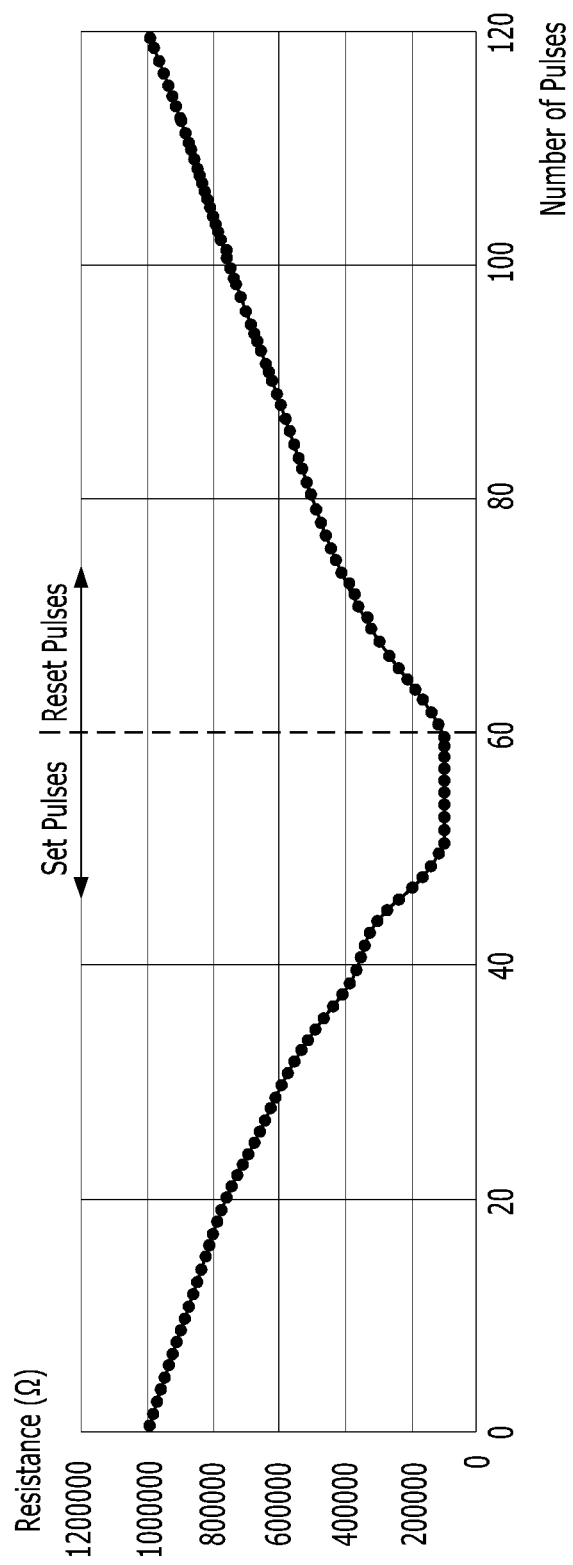

FIGS. 5A to 5C are graphs illustrating current variations of embodiments of the synapse 30b of FIG. 4A having transistors 35 and 36 with different channel widths in accordance with embodiments of the present disclosure. FIGS. 6A to 6C are graphs illustrating resistance variations of embodiments of the synapse 30b of FIG. 4A having transistors 35 and 36 with different channel widths in accordance with embodiments of the present disclosure. Specifically, each of FIGS. 5A and 6A show a synapse current variation and a synapse resistance variation when the channel width is about 0.5 μm, each of FIGS. 5B and 6B show a synapse current variation and a synapse resistance variation when the channel width is about 1.0 μm, and each of FIGS. 5C and 6C show a synapse current variation and a synapse resistance variation when the channel width is about 5.0 μm.

Referring to FIGS. 5A to 5C and 6A to 6C, as the channel width of the transistor in the synapse 30b becomes larger, the synapse 30b exhibits a more gradual current variation and a more gradual resistance variation with respect to the applied pulses than the conventional synapse 3. Accordingly, adjusting the channel width of each of the transistors 35 and 26 of the synapse 30b can provide the synapse 30b with multiple resistance levels, and can provide the synapse 30b with linear current variations and linear resistance variations with respect to the number of set pulses and reset pulses applied to the synapse 30b.

FIGS. 7A to 7D are diagrams illustrating synapses 30c to 30f of neuromorphic devices in accordance with various embodiments of the present disclosure.

Figure 7A:
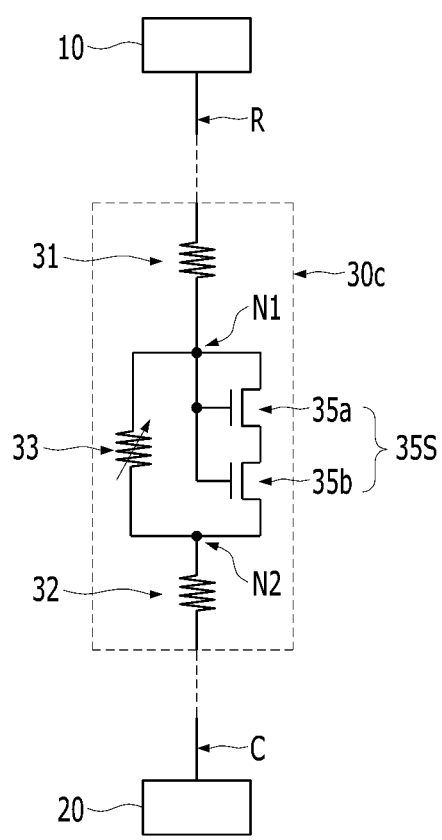
FIGS. 7A to 7D are diagrams illustrating synapses of neuromorphic devices in accordance with various embodiments of the present disclosure.

Referring to FIG. 7A, the synapse 30c may include a pre-resistor 31, a first node N1, a variable resistor 33, a transistor string 35S, a second node N2, and a post-resistor 32. Each of the variable resistor 33 and the transistor string 35S may be coupled between the first node N1 and the second node N2, such that the variable resistor 33 and the transistor string 35S are electrically connected with each other in parallel. The transistor string 35S may include an upper position transistor 35a and a lower position transistor 35b, which are electrically connected with each other. A gate electrode and a drain electrode of the upper position transistor 35a may be electrically connected with the first node N1. A source electrode of the upper position transistor 35a may be electrically connected with a drain electrode of the lower position transistor 35b. A gate electrode of the lower position transistor 35b may be electrically connected with the first node N1 and the gate electrode of the upper position transistor 35a. A source electrode of the lower transistor 35b may be electrically connected with the second node N2.

Figure 7B:
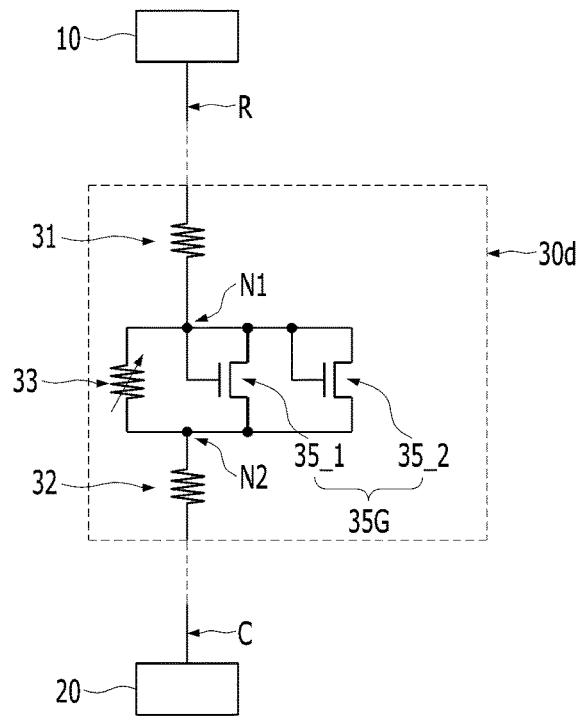

Referring to FIG. 7B, the synapse 30d may include a pre-resistor 31, a first node N1, a variable resistor 33, a transistor group 35G, a second node N2, and a post-resistor 32. Each of the variable resistor 33 and the transistor group 35G may be coupled between the first node N1 and the second node N2, such that the variable resistor 33 and the transistor group 35G are electrically connected with each other in parallel. The transistor group 35G may include a plurality of transistors 35_1 and 35_2 connected with each other in parallel. Gate electrodes and drain electrodes of the transistors 35_1 and 35_2 may be electrically connected with the first node N1, and source electrodes of the transistors 35_1 and 35_2 may be electrically connected with the second node N2.

Figure 7C:
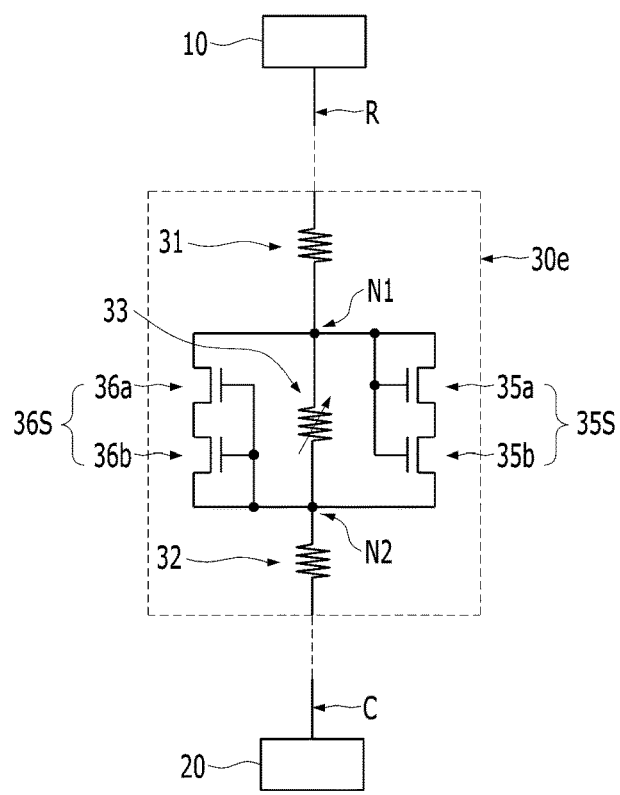

Referring to FIG. 7C, the synapse 30e may include a pre-resistor 31, a first node N1, a variable resistor 33, first and second transistor strings 35S and 36S, a second node N2, and a post-resistor 32. Each of the variable resistor 31, the first transistor string 35S, and the second transistor string 36S may be coupled between the first node N1 and the second node N2, such that the variable resistor 31, the first transistor string 35S, and the second transistor string 36S are electrically connected with each other in parallel.

Each of the first and second transistor strings 35S and 36S may include an upper position transistor 35a or 36a, and a lower position transistor 35b or 36b. The first transistor string 35S may include the upper and lower position transistors 35a and 35b, which are electrically connected with each other in series. The second transistor string 36S may include the upper and lower position transistors 36a and 36b, which are electrically connected with each other in series.

A gate electrode and a drain electrode of the first upper position transistor 35a of the first transistor string 35S may be electrically connected with the first node N1. A source electrode of the first upper position transistor 35a of the first transistor string 35S may be electrically connected with a drain electrode of the first lower position transistor 35b. A gate electrode of the first lower position transistor 35b of the first transistor string 35S may be electrically connected with the first node N1 and the gate electrode of the first upper transistor 35a. A source electrode of the first lower position transistor 35b of the first 35S may be electrically connected with the second node N2.

A drain electrode of the second upper position transistor 36a of the second transistor string 36S may be electrically connected with the first node N1. A gate electrode of the second upper position transistor 36a, a gate electrode of the second lower position transistor 36b, and a source electrode of the second lower position transistor 36b of the second transistor string 36S may be electrically connected with the second node N2. A source electrode of the second upper position transistor 36a of the second transistor string 36S may be electrically connected with a drain electrode of the second lower position transistor 36b.

Figure 7D:
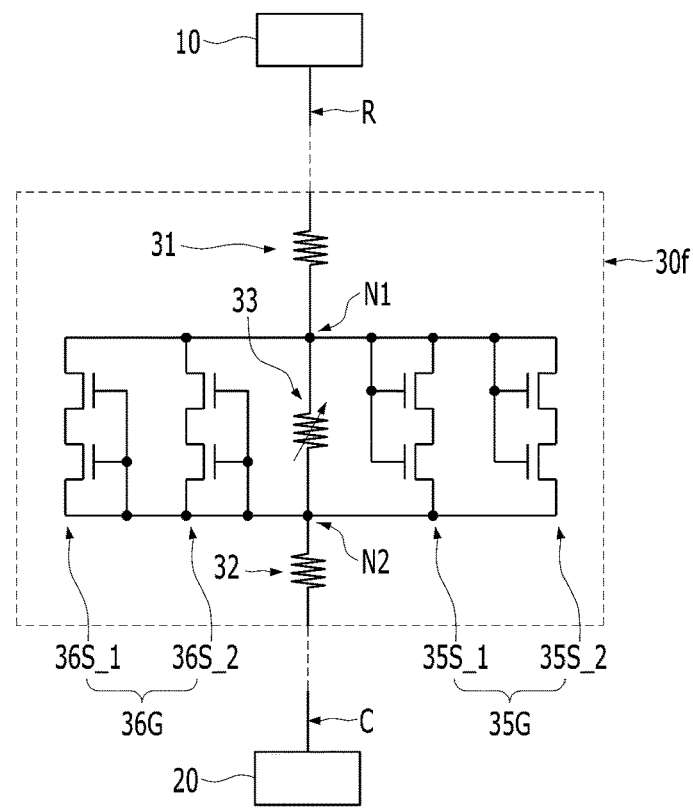
Figure 8A:
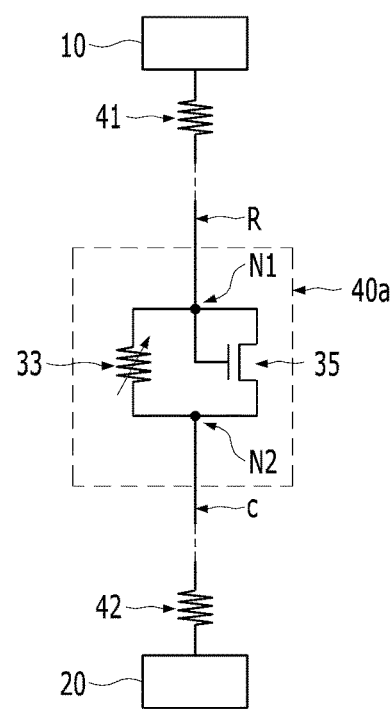
FIGS. 8A to 8F are diagrams schematically illustrating neuromorphic devices in accordance with various embodiments of the present disclosure.
Figure 8B:
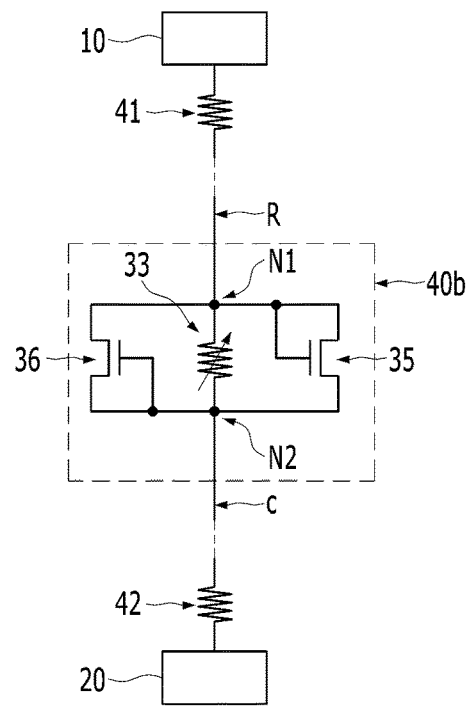
Figure 8C:
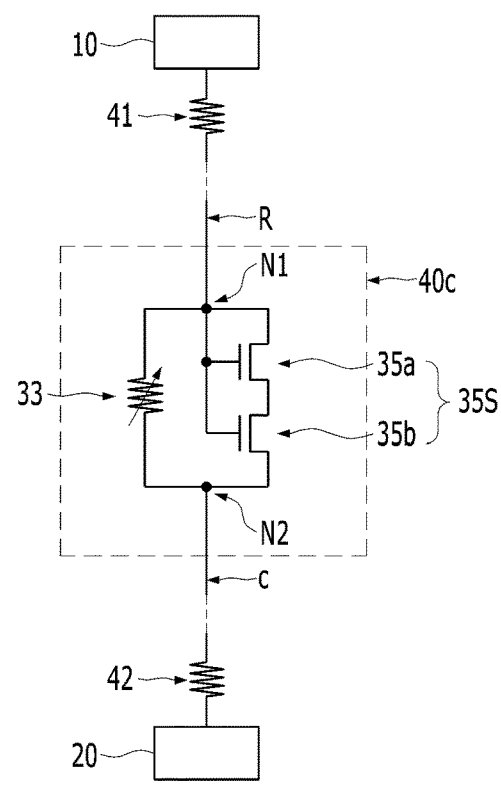
Figure 8D:
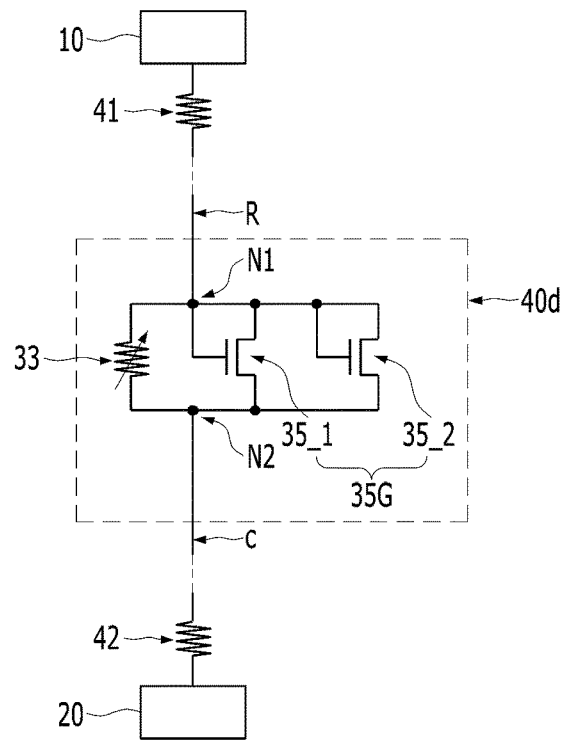
Figure 8E:
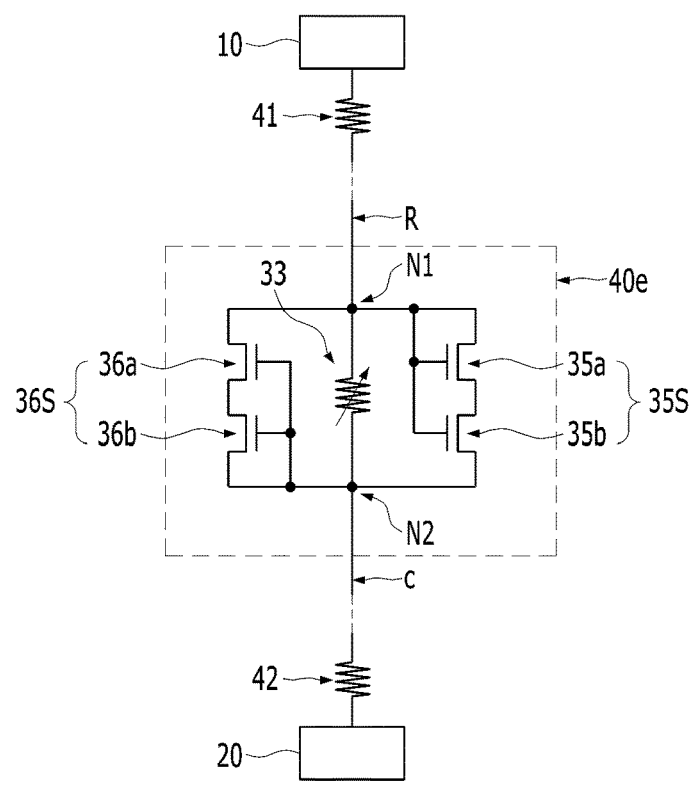
Figure 8F:
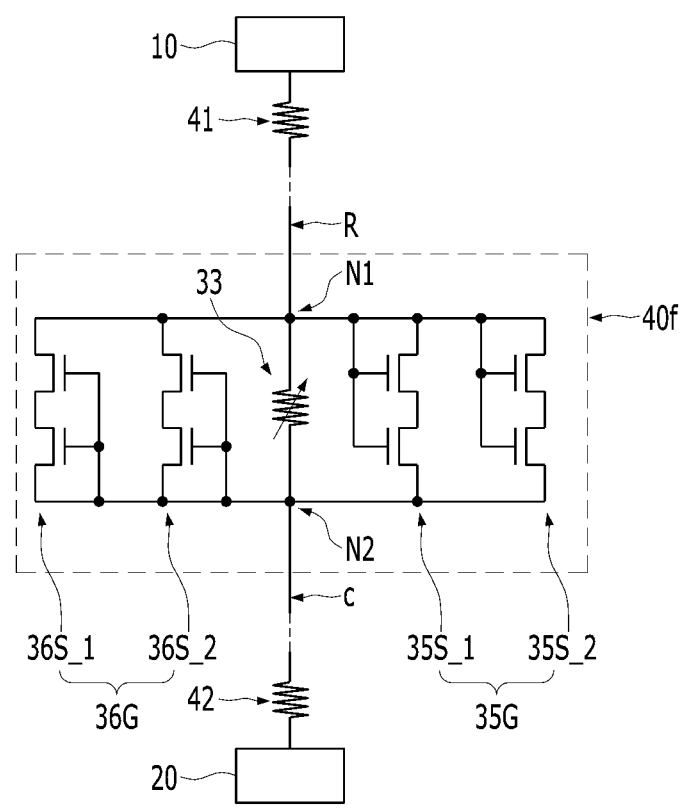

Referring to FIG. 7D, the synapse 30f may include a pre-resistor 31, a first node N1, a variable resistor 33, first and second transistor groups 35G and 36G, a second node N2, and a post-resistor 32. Each of the variable resistor 33, the first transistor group 35G, and the second transistor group 36G may be coupled between the first node N1 and the second node N2, such that the variable resistor 33, the first transistor group 35G, and the second transistor group 36G are electrically connected with each other in parallel. The first and the second transistor groups 35G and 36G of FIG. 7D can be understood with reference to the transistor group 35G of FIG. 7B and the first and second transistor strings 35S and 36S of FIG. 7C.

In expanded embodiments of the present disclosure, each of the first and second transistor strings 35S and 36S shown in FIGS. 7B to 7D may include three or more transistors connected in series, and each of the first and the second transistor groups 35G and 36G shown in FIGS. 7B to 7D may include three or more transistors connected in parallel. Furthermore, the first and second transistor strings 35S and 36S and the first and second transistor groups 35G and 36G can be combined in embodiments of the present disclosure.

Referring to FIGS. 7A to 7D, the synapses 30c to 30f in accordance with the embodiments of the present disclosure may include a plurality of transistors which are electrically connected with other in series, in parallel, or both. Accordingly, channel lengths, channel widths, and threshold voltages of the transistors of the synapses 30c to 30f can be adjusted in detail. That is, the synapses 30c to 30f can realize desired resistance and current variations by combining various factors and parameters.

FIGS. 8A to 8F are diagrams schematically illustrating neuromorphic devices in accordance with various embodiments of the present disclosure.

Referring to FIGS. 8A to 8F, each of the neuromorphic devices may include a common pre-resistor 41 adjacent to a pre-synaptic neuron 10, a row line R, synapses 40a to 40f, a column line C, a common post-resistor 42, and a post-synaptic neuron 20. Compared to the synapses 30a to 30f shown in FIGS. 3A, 4A, and 7A to 7D, the synapses 40a to 40f may omit the pre-resistor 31 and the post-resistor 32. For example, the pre-resistor 31 and the post-resistor 32 can be changed into the common pre-resistor 41 and the common post-resistor 42, respectively, as illustrated in FIGS. 8A to 8F. Each of the common pre-resistor 41 and the common post-resistor 42 may be coupled to a plurality of synapses.

Figure 9:
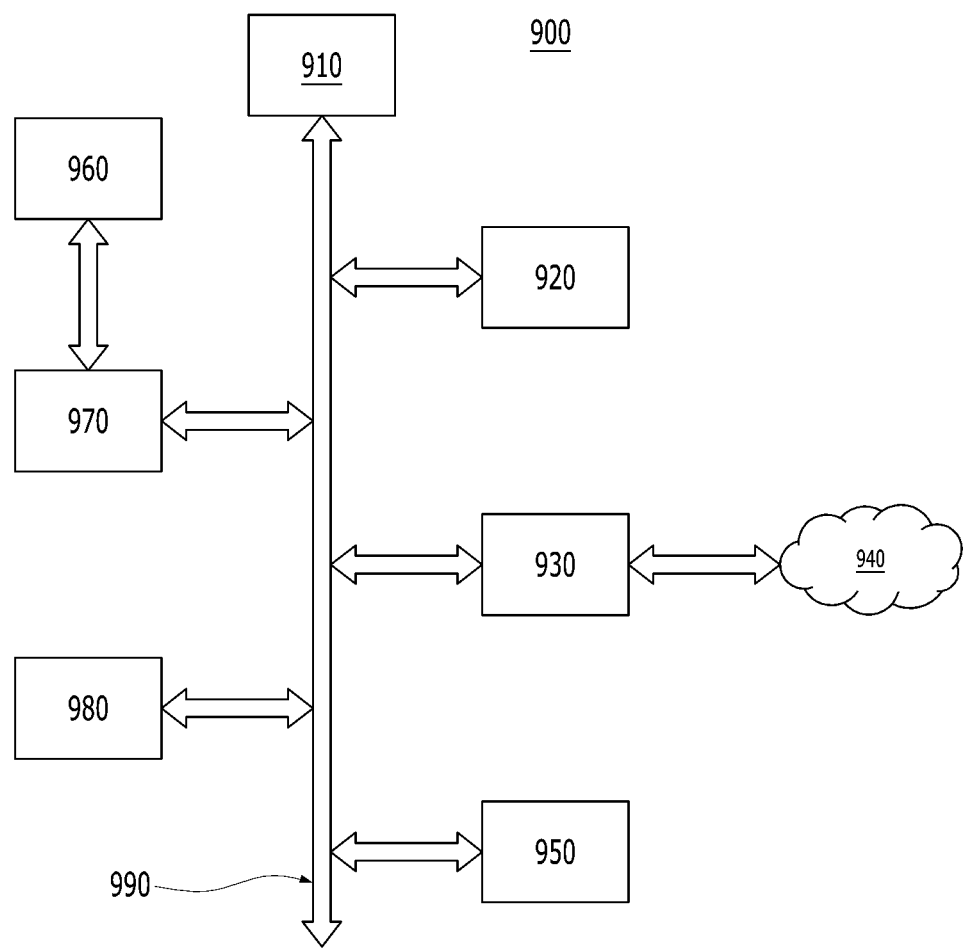
FIG. 9 is a diagram schematically illustrating a pattern recognition system in accordance with an embodiment of the present disclosure.

FIG. 9 is a diagram schematically illustrating a pattern recognition system in accordance with an embodiment of the present disclosure. For example, a pattern recognition system 900 may include a speech recognition system, an imaging recognition system, a code recognition system, a signal recognition system, and one or more systems for recognizing various patterns.

Referring to FIG. 9, the pattern recognition system 900 in accordance with the embodiment of the present disclosure may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on an output from the neuromorphic unit 980.

The CPU 910 may be connected with the memory unit 920, the communication control unit 930, the output unit 950, the ADC 970, and the neuromorphic unit 980 through the bus 990.

The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices. The output unit 950 may output, for example, speech and/or image recognition data.

The input unit 960 may include any of a microphone, a camera, a scanner, a touch pad, a keyboard, a mouse, a mouse pen, and one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

The synapses in accordance with the embodiments of the present disclosure can have gradual and linear resistance variations with respect to a number of applied pulses.

The synapses in accordance with the embodiments of the present disclosure can have gradual resistance variations as pulses are applied.

Accordingly, the synapses in accordance with the present disclosure can have multiple resistance values more than the conventional synapses.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
   a pre-synaptic neuron;
   a row line extending in a row direction from the pre-synaptic neuron;
   a post-synaptic neuron;
   a column line extending in a column direction from the post-synaptic neuron; and
   a synapse disposed at an intersection region between the row line and the column line,
   wherein the synapse comprises:
   a first node electrically connected with the row line;
   a second node electrically connected with the column line; and
   a variable resistor and a first transistor electrically coupled between the first node and the second node, and
   wherein the variable resistor and the first transistor are electrically connected with each other in parallel,
   wherein the synapse further comprises a second transistor coupled between the first node and the second node, and
   wherein the second transistor, the variable resistor, and the first transistor are electrically connected with each other in parallel.

2. The neuromorphic device of claim 1,
   wherein a gate electrode and a drain electrode of the first transistor are electrically connected with the first node.

3. The neuromorphic device of claim 2,
   wherein a source electrode of the first transistor is electrically connected with the second node.

4. The neuromorphic device of claim 1,
   wherein a gate electrode and a source electrode of the second transistor are electrically connected with the second node.

5. The neuromorphic device of claim 4,
   wherein a drain electrode of the second transistor is electrically connected with the first node.

6. The neuromorphic device of claim 1,
   wherein the synapse further comprises a pre-resistor coupled between the pre-synaptic neuron and the first node.

7. The neuromorphic device of claim 6,
   wherein the pre-resistor is coupled between the row line and the first node.

8. The neuromorphic device of claim 1, further comprising a pre-resistor that is coupled between the pre-synaptic neuron and the row line.

9. The neuromorphic device of claim 1,
   wherein the synapse further comprises a post-resistor coupled between the second node and the post-synaptic neuron.

10. The neuromorphic device of claim 9,
    wherein the post-resistor is coupled between the second node and the column line.

11. The neuromorphic device of claim 1, further comprising a post-resistor that is coupled between the column line and the post-synaptic neuron.

12. A neuromorphic device comprising:
    a pre-synaptic neuron;
    a row line extending in a row direction from the pre-synaptic neuron, the row line being coupled to a first node;
    a post-synaptic neuron;
    a column line extending in a column direction from the post-synaptic neuron, the column line being coupled to a second node; and
    a synapse disposed at an intersection region between the row line and the column line,
    wherein the synapse comprises a variable resistor and a first transistor string coupled between the first node and the second node, the variable resistor and the first transistor string being electrically connected with each other in parallel,
    wherein the first transistor string comprises a plurality of first transistors electrically connected with each other in series, and
    wherein each gate electrode of the plurality of first transistors is electrically connected with the first node.

13. The neuromorphic device of claim 12,
    wherein the synapse further comprises a second transistor string disposed between the first node and the second node, and
    wherein the second transistor string, the variable resistor, and the first transistor string are connected with each other in parallel.

14. The neuromorphic device of claim 13,
    wherein the second transistor string comprises a plurality of second transistors electrically connected with each other in series, and
    wherein each gate electrode of the plurality of second transistors is electrically connected with the second node.

15. The neuromorphic device of claim 13,
wherein the synapse further comprises a third transistor string and a fourth transistor string, each of which is disposed between the first node and the second node, and
wherein the fourth transistor string, the second transistor string, the variable resistor, the first transistor string, and the third transistor string are connected with each other in parallel.

16. The neuromorphic device of claim 15,
wherein the third transistor string comprises a plurality of third transistors electrically connected with each other in series, and
wherein each gate electrode of the plurality of third transistors is electrically connected with the first node.

17. The neuromorphic device of claim 16,
wherein the fourth transistor string comprises a plurality of fourth transistors electrically connected with each other in series, and
wherein each gate electrode of the plurality of fourth transistors is electrically connected with the second node.

18. A neuromorphic device comprising:
a pre-synaptic neuron;
a row line extending in a row direction electrically connected with the pre-synaptic neuron;
a post-synaptic neuron;
a column line extending in a column direction electrically connected with the post-synaptic neuron; and
a synapse disposed at an intersection region between the row line and the column line,
wherein the synapse comprises:
a first fixed resistor electrically connected with the row line;
a second fixed resistor electrically connected with the column line; and
a variable resistor and a first transistor electrically coupled between the first fixed resistor and the second fixed resistor,
wherein the variable resistor and the first transistor are electrically connected with each other in parallel between the first fixed resistor and the second fixed resistor.

19. The neuromorphic device of claim 18,
wherein the synapse further comprises a second transistor coupled between the first fixed resistor and the second fixed resistor, and
wherein the second transistor, the variable resistor, and the first transistor are electrically connected with each other in parallel between the first fixed resistor and the second fixed resistor.

20. The neuromorphic device of claim 18,
wherein a gate electrode and a drain electrode of the first transistor are electrically connected with the first fixed resistor, and a source electrode of the second transistor is electrically connected with the second fixed resistor.

* * * * *